United States Patent [19]

McCary et al.

[11] 3,844,909

[45] Oct. 29, 1974

[54] MAGNETIC FILM PLATED WIRE AND SUBSTRATES THEREFOR

[75] Inventors: Richard O. McCary; Fred E. Luborsky, both of Schenectady, N.Y.

[73] Assignee: General Electric Company, Schenectady, N.Y.

[22] Filed: Feb. 9, 1973

[21] Appl. No.: 330,955

Related U.S. Application Data

[60] Division of Ser. No. 89,002, Nov. 12, 1970, Pat. No. 3,753,665, which is a continuation-in-part of Ser. No. 658,942, Aug. 7, 1967, abandoned.

[52] U.S. Cl. .................. 204/40, 204/28

[51] Int. Cl. .................. C23b 5/46, C23b 5/58

[58] Field of Search .................. 204/27, 28, 40, 43 T; 29/191.6

[56] References Cited

UNITED STATES PATENTS

| | | | |
|---|---|---|---|
| 3,330,631 | 7/1967 | Tsu | 204/40 |
| 3,411,892 | 11/1968 | Sasaki et al. | 204/40 |
| 3,506,546 | 4/1970 | Semienko et al. | 204/28 |
| 3,556,954 | 1/1971 | Luborsky | 204/28 |
| 3,622,469 | 11/1971 | Alberts | 204/43 T |

*Primary Examiner*—T. M. Tufariello
*Attorney, Agent, or Firm*—Paul F. Wille; Joseph T. Cohen; Jerome C. Squillaro

[57] ABSTRACT

A small diameter magnetic film plated wire for memory devices is constructed utilizing an inner core selected from the group consisting of tungsten and molybdenum. In a preferred embodiment of the magnetic film plated wire, a tungsten core is successively overlaid with a gold strike layer, a rapidly deposited relatively thick copper conductive layer, a slowly deposited smooth copper layer, a gold layer and a circumferentially oriented magnetic nickel-iron film.

8 Claims, 2 Drawing Figures

PATENTED OCT 29 1974 3,844,909

MAGNETIC FILM PLATED WIRE AND SUBSTRATES THEREFOR

Figure 1:
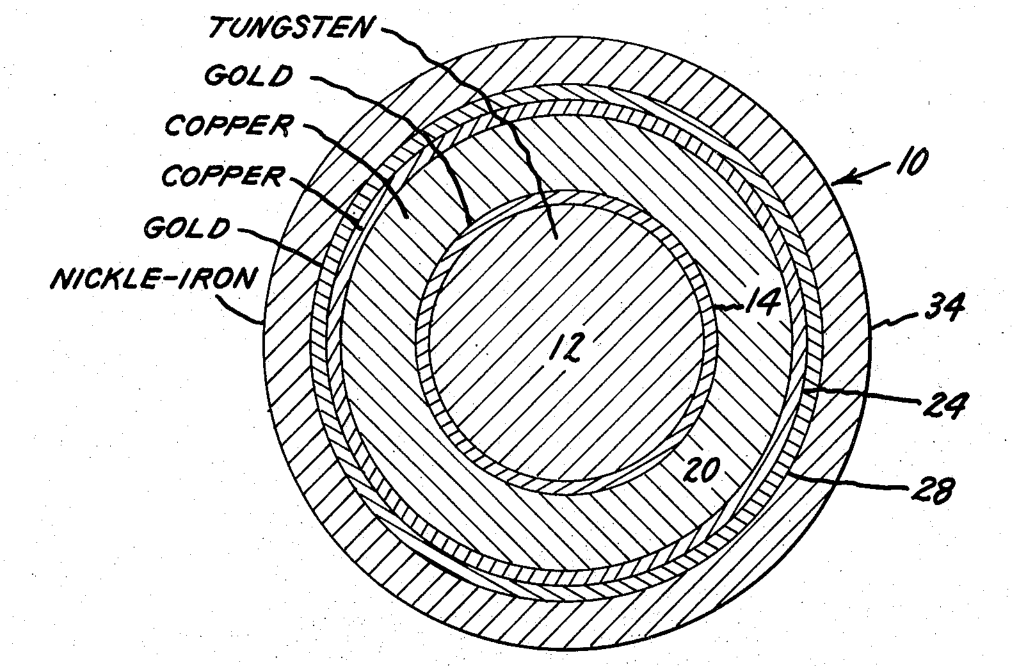

This is a division of application Ser. No. 89,002 filed Nov. 12, 1970 now U.S. Pat. No. 3,753,665 which in turn is a continuation of application Ser. No. 658,942, 8-7-67 now abandoned.

This invention relates to magnetic film plated wires for memory devices and in particular to magnetic film plated wires having an inner core selected from the group consisting of tungsten and molybdenum.

Magnetic film plated wires for memory devices heretofore generally have been fabricated by copper plating an etched beryllium-copper wire and subsequently electrodepositing a magnetic film, such as nickel-iron, nickel-iron cobalt or similar alloys, upon a current carrying portion of the copper plated beryllium-copper wire to produce a circumferential orientation of the deposited magnetic layer. Alternatively, a longitudinal orientation of the magnetic film can be produced utilizing an externally applied field along the wire axis. The tensile stresses impressed upon the wire as the wire is drawn between plating baths, the tolerable resistance losses of the plated wire within the nickel-iron bath for uniform characteristics in the deposited magnetic film and the strength required for reasonable ease of handling during assembly into a memory structure however have necessitated a substantial diameter, e.g., at least 5 mils, for the beryllium-copper core notwithstanding the obvious desirability of compactness, especially when the plated wire is to be utilized in the construction of memory devices having bit memories numbering in the millions. Furthermore because the commercially drawn beryllium-copper core of the magnetic film plated wire generally is characterized by a large number of pits and small scratches due to the drawing process required for producing the wire, a smooth surface on the successive overlayers of copper and nickel-iron, as is required for uniform magnetic characteristics in the plated wire, is achieved only with great difficulty.

It is therefore an object of this invention to provide a relatively small diameter, mechanically strong magnetic film plated wire.

It is also an object of this invention to provide a magnetic film plated wire having an exceptionally smooth substrate for the magnetic film.

It is another object of this invention to provide a magnetic film plated wire having a smooth coated core which can be vigorously cleaned.

It is a still further object of this invention to provide a small diameter, mechanically strong magnetic film substrate capable of exhibiting sufficient conductivity for uniform magnetic film deposition.

These and other objects of this invention generally are achieved in a magnetic film plated wire for memory devices wherein an oriented magnetic film overlies a conductive wire by the utilization of an inner core for the conductive wire selected from the group consisting of tungsten and molybdenum. Preferably the core is overlaid with a strike layer selected from the group consisting of gold, silver and copper with the strike layer being clad to the core by heat treating the plated core at elevated temperatures. The strike layer forms an extremely smooth outer surface capable of readily adhering to subsequently deposited non-magnetic layers, such as gold and/or copper, which layers are deposited atop the strike layer to further smooth the wire substrate and to reduce the resistivity of the wire substrate either for the subsequent deposition of the magnetic layer thereon, or as desired for ultimate application in a memory.

Figure 2:
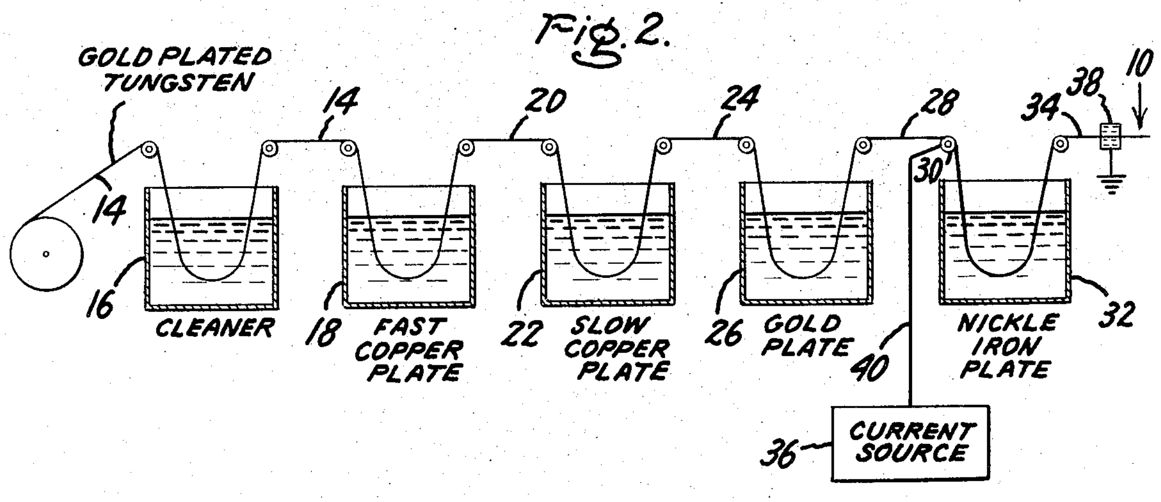

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a sectional portrayal of a magnetic film plated wire constructed in accordance with this invention, and FIG. 2 is a flow chart depicting a suitable method of forming the magnetic film plated wire of this invention.

A magnetic film plated wire 10 constructed in accordance with this invention is depicted in FIG. 1 and generally includes a tungsten core 12 of small diameter, e.g., approximately 2 mils, clad with a gold strike layer 14 by any suitable known means utilized for cladding gold to tungsten, e.g., passing the tungsten wire through a gold plating electrolytic solution containing 3–3.5 ounces of potassium gold cyanide per gallon of solution, 7–7.5 ounces of potassium cyanide per gallon of solution and 0.5–0.75 ounces of potassium hydroxide per gallon of solution. A platinum electrode is submerged in the bath and a potential is applied between the tungsten wire and the gold electrode to deposit a thin gold layer, e.g., 0.1–0.01 mil thick, upon the tungsten wire. The gold coated tungsten wire then is passed into a heating chamber (not shown) having a neutral or reducing atmosphere, e.g., 75% hydrogen and 25% nitrogen by volume, and the gold coated tungsten wire is heat treated at approximately 1,600° to 1,900°F to cause the strike layer of gold 14 to bond with the tungsten wire surface. Preferably the gold coating should comprise approximately 5% by weight of a 2 mil diameter tungsten wire to permit complete covering of the tungsten surface while allowing a small quantity of the gold to flow into the pits or small scratches characteristically formed in the surface of the tungsten wire during the commercial drawing process. Gold clad tungsten not only is smaller in cross-section than beryllium-copper alloys of comparable tensile strength, e.g., a 2 mil diameter gold coated tungsten wire is approximately equal in strength and stiffness to a 5 mil diameter beryllium-copper wire, but the bonding of the gold onto the tungsten produces a far smoother surface than commerically drawn beryllium-copper wires thereby enhancing the magnetic characteristics in subsequently deposited magnetic films.

Although core 12 preferably is of extremely small cross-sectional area for most magnetic film purposes, the core can have a larger diameter up to approximately 10 mils when superior strength is desired. Core diameters smaller than the 2 mil diameter of core 12 in the specific example of FIG. 1 often may be desirable to further increase the density of packing or for other reasons related to the ultimate application of the plated wire in a memory.

While gold plated tungsten wire may be formed by the method previously described, preferably 5% gold clad tungsten wire of approximately 2 mil diameter suitable for the fabrication of magnetic film plated wires is obtained commercially, e.g. from the Dover Wire Works, of the General Electric Company, Dover, Ohio. When the gold clad tungsten wire is commercially obtained, the outer surface of the wire is cleaned by drawing the wire through a cleaner bath 16, as portrayed in FIG. 2. Bath 16 can be any of the known electrochemical cleansing solutions for relatively inactive metals and may have a composition of 12–22 g/l sodium carbonate, 8–18 g/l trisodium phosphate, 3–12 g/l sodium hydroxide and 0.3–0.5 g/l surface active agent (for a foam blanket), e.g., a composition identical to the copper and copper base alloy cleaner disclosed on page 554 of the second edition of Modern Electroplating by Frederick A. Lowenheim, published by John Wiley and Sons. Because the gold surface is relatively inactive, a vigorous cleaning in bath 16 is permissble.

After successively rinsing the clean gold clad tungsten wire in tap and distilled water, the wire is passed into an acidic copper bath 18, e.g., $CuSO_4$ and sufficient $H_2SO_4$ to bring the pH level to 0.5, and a relatively thick copper layer 20 is rapidly deposited upon the gold strike layer 14 at a high current density from the copper bath. Because copper layer 20 is of relatively high purity and therefore exhibits a relatively high electrical conductivity, a 0.25 mil thick copper layer deposited atop a 2 mil diameter gold coated tungsten wire has been found to have sufficient conductivity per unit length to subsequently achieve a substantially uniform deposition of circumferentially oriented magnetic film utilizing conventional deposition methods (as will be more fully explained hereinafter with reference to the plating of nickel-iron film 34).

After the rapid deposition of copper layer 20, the coated wire is rinsed in tap and distilled water and passed into a bath 22 containing 225 grams $CuSO_4 \cdot 5H_2O$ per liter solution, 0.05 grams theourea per liter solution, 0.5 grams acid naphthol-2 sulfuric-6 per liter solution, and approximately 12 milliliters $H_2SO_4$ per liter solution to bring the pH level of the solution to 0.7. Bath 22 is agitated in a conventional manner, e.g., such as by utilization of the plating cell shown in FIG. 3 of an article by M. W. Sagal entitled "Preparation of Electrodeposited Cylindrical Magnetic Films," Journal of the Electrochemical Society, Vol. 112, No. 2, February, 1965, page 174, and a current density of 30–40 ma/cm$^2$ is employed to deposit a 1–5 micron thick smooth copper layer 24 upon copper layer 20. Although the low current density utilized in the deposition of copper layer 24 requires a long interval for deposition of a fixed quantity of copper, the slower deposition rate of copper layer 24 as compared with the rapid deposition rate, e.g., approximately 100 ma/cm$^2$, of copper layer 20 together with the presence of the above mentioned organic additives in electrolytic bath 22 assures a highly smooth surface to support the subsequently to be deposited platings. Thus copper layer 20 basically is employed to increase the conductivity of the conductive substrate to a level suitable for operation in the memory and to prevent significant voltage gradients along the wire during the conventional deposition of a uniform magnetic film, e.g., by passing current through the conductive substrate in the magnetic film bath during deposition of the magnetic film to form a circumferentially oriented magnetic film upon the substrate, while copper layer 24 is a smoothing layer to provide a surface of uniform geometry for the subsequently to be deposited films. Because copper layer 24 generally is only 1–5 microns thick, as compared with copper layer 20 which may be 12.5 microns thick, the deposition time of copper layer 24 can be made approximately equal to the deposition time of the thicker copper layer thereby permitting the wire to be drawn through the successive baths at a constant speed. Although conductive copper layer 20 can be deposited under the identical conditions utilized for the deposition of copper layer 24, the substantial time interval required to deposit an approximately 12.5 micron thick layer employing slower deposition bath 22 generally negates the deposition of copper layers 20 and 24 as single layers in commercial production.

After deposition of copper layer 24, the copper coated wire is rinsed and passed into a suitable gold plating bath 26 containing, for example, a gold salt, a complexing agent and an additive, for the deposition of a gold layer 28 atop smooth copper layer 24. An acidic solution of Orosene 999, manufactured by Technic Corporation, having a pH of 4.5 and a temperature of 25°C was found suitable for the deposition of a 500 to 1,000 A thick smooth gold layer 28 utilizing a current density of 10–15 ma/cm$^2$. Gold layer 28 formed by this deposition process is characterized by a fine grain structure of 100 A or less in comparison to the relatively coarse grain structure of heat treated gold layer 14.

After the plating of gold coating 28 atop copper layer 24, the plated wire is rinsed and passed over a gold plated brass supply reel 30 into a magnetic layer bath 32 wherein a nickel-iron layer 34 of approximately 10,000 A or less is deposited atop the gold. Magnetic layer bath 32 can be any of the known conventional baths suitable for deposition of cylindrical magnetic films and may consist of 250 grams nickel sulfate per liter solution, 2 to 10 grams iron sulfate per liter solution, 25 grams boric acid per liter solution, 0.8 grams saccharin per liter solution and 0.4 grams sodium lauryl sulfate per liter solution. A field of approximately 50 oersteds required for orientation of the deposited magnetic film is produced in a suitable manner, e.g., for circumferential orientation, a current is passed from current source 36 through the portion of the wire substrate in bath 32 utilizing gold plated brass supply wheel 30 and grounded mercury contacts 38 to make noninjurious electrical connection to the desired portion of the magnetic film substrate. Thus current flows from source 36 through external lead 40 and gold plated brass supply wheel 30 to the magnetic film substrate wire just prior to the wire entering bath 32. The current then flows through that portion of the wire in the magnetic film bath and returns to ground by means of grounded fluid mercury contacts 38 through which contacts the magnetic film plated wire is drawn. Copper layer 20 and tungsten core 12 provide sufficient conductivity of the relatively small diameter wire, e.g. a conductivity approximately equal to a 5 mil diameter beryllium-copper substrate, to assure a small voltage gradient and a uniform deposition of magnetic film 34 along the length of the wire submerged in bath 32. Magnetic film 34 is deposited employing a suitable electrolytic current density, e.g., approximately 14 ma/cm$^2$, for the required time interval to deposit the magnetic film to the desired thickness e.g., 10,000 A or less. A description of other conventional plating processes suitable for depositing magnetic film 34 upon the conductive wire substrate may be obtained by reference to an article by C. Le Mehaute and E. Rocher entitled "Electrodeposition of Strain-insensitive Ni-Fe and Ni-Fe-Cu Magnetic Alloys" in the March, 1965 edition of the IBM Journal, pages 141–146 and in the previously referred to Sagal article in the Journal of the Electrochemical Society.

The suitability of tungsten core 12 for magnetic film plated wires was evidenced by depositing a magnetic film directly atop gold strike layer 14 of tungsten core 12, e.g., gold layer 28 and copper layers 20 and 24 were omitted from the magnetic film plated wire depicted in FIG. 1. Utilizing an electrolytic current density of 14 ma/cm$^2$ for slightly over 5 minutes and an external magnetic field of 50 oersteds along the wire axis generated by two coils (not shown) disposed at opposite ends of the nickel-iron plate bath to produce a longitudinal magnetic orientation in the deposited magnetic film, a nickel-iron film approximately 1.3 microns thick was deposited atop gold strike layer 14. Subsequent measurement utilizing a hysteresis loop tracer disclosed that the nickel-iron layer had a coercivity of 2.0 oersteds and a remanence to saturation magnetization of 0.96 thereby indicating the magnetic film plated wire to be suitable for magnetic memory devices even without copper layers 20 and 24 and gold layer 28.

To avoid contamination of one bath by another, a rinsing of the wire in both tap and distilled water is accomplished after each plating or cleaning process. In all the plating processes, an inactive anode such as platinum preferably is employed for the electrodeposition of the films upon the wire although active anodes may be used. If greater stability in the plated wire is desired, magnetic film plated wire 10 can be annealed after deposition of the magnetic film at an elevated temperature for a short period of time, e.g., 200°C. for 2 minutes.

Although conductive core 12 preferably is tungsten because of the relatively high strength of tungsten, molybdenum also can be utilized as the strengthening core of the magnetic film plated wire of this invention. When molybdenum is used, the deposition of the gold strike layer and the heat treating of the gold strike layer is identical to that described for tungsten. When a copper strike layer is desired for the molybdenum or tungsten core, the copper layer can be deposited utilizing bath No. 1 described on pages 156 and 159 of the prior mentioned Modern Electroplating book by Frederick Lowenstein. After plating the copper strike layer atop the molybdenum or tungsten core, the strike layer is heat treated generally to approximately the same temperature as the gold strike layer, e.g., 1,600° to 1,900°F. to produce a bonding of the copper onto the surface of the core. The remainder of the magnetic film plated wire can then be fabricated in the manner previously described with reference to plated wire 10, e.g. by sequentially depositing at least one conductive metallic layer and a circumferentially oriented magnetic film atop the copper clad core.

A silver strike layer can be deposited atop the tungsten or molybdenum core employing any one of the silver deposition baths described on page 328, Table I of the previously cited Lowenstein book. A current density of 75–100 ma/cm$^2$ and an electrolytic bath temperature of 38°–47°C. preferably is employed during the plating and the silver is clad to the core by subsequently heat treating the silver plated core at a temperature of approximately 1,600° to 2,000°F. The remaining layers forming the magnetic film plated wire then are plated atop the silver layer in the same manner as previously described in the plating of the gold clad tungsten substrate.

While several examples of this invention have been shown and described, it will be apparent to those skilled in the art that many changes may be made without departing from this invention in its broader aspects; and therefore the appended claims are intended to cover all such changes and modifications as fall within the true spirit and scope of this invention.

What I claim as new and desire to secure by Letters Patent of the United States is:

1. The method of making magnetic film plated wire for memory devices comprising the steps of:

electrolytically depositing on a gold clad wire, having a core selected from the group consisting of tungsten and molybdenum, a first copper layer to produce a first surface geometry;

electrolytically depositing on said first copper layer a second copper layer to produce a different surface geometry from said first surface geometry; and electrolytically depositing on said second copper layer of magnetic film, selected from the group consisting of nickel-iron and alloys thereof.

2. The method of making a magnetic film plated wire for memory devices as set forth in claim 1 wherein said first copper layer is deposited using a high deposition current density.

3. The method of making a magnetic film plated wire for memory devices as set forth in claim 2 wherein said first copper layer is deposited to a thickness of from approximately 0.25 to 0.50 mils.

4. The method of making a magnetic film plated wire for memory devices as set forth in claim 3 wherein said second copper layer is deposited to a thickness of from approximately 0.04 to 0.20 mils.

5. The method of making a magnetic film plated wire for memory devices as set forth in claim 4 wherein said second copper layer is deposited in an electrolytic bath containing organic additives by a low deposition current density to produce said different surface geometry.

6. The method of making a magnetic film plated wire for memory devices as set forth in claim 5 wherein the deposition time is the same at the high and low current densities so that the first and second copper layers can be produced on a continuous basis.

7. The method of making a magnetic film plated wire for memory devices as set forth in claim 2 wherein said high current density is on the order of 100 ma/cm$^2$.

8. The method of making a magnetic film plated wire for memory devices as set forth in claim 5 wherein said low current density is on the order of 35 ma/cm$^2$.

* * * * *